United States Patent [19]

Morikawa et al.

[11] Patent Number: 5,359,775
[45] Date of Patent: Nov. 1, 1994

[54] STEEL-MATERIAL SHEARING MACHINE

[75] Inventors: Sumio Morikawa; Hiroyuki Satone, both of Osaka, Japan

[73] Assignee: Ohyodo Diesel Co., Ltd., Osaka, Japan

[21] Appl. No.: 136,733

[22] Filed: Oct. 14, 1993

Related U.S. Application Data

[63] Continuation of Ser. No. 916,615, Jul. 22, 1992, abandoned.

[30] Foreign Application Priority Data

Mar. 31, 1992 [JP] Japan .................. 4-075068

[51] Int. Cl.5 .................................. B23P 19/00
[52] U.S. Cl. .................................. 30/134; 30/228
[58] Field of Search ............. 30/134, 180, 228; 144/34 E; 241/101.7

[56] References Cited

U.S. PATENT DOCUMENTS

| | | | |
|---|---|---|---|
| 4,519,135 | 5/1985 | LaBounty | 30/134 |
| 4,541,177 | 9/1985 | Hollander | 30/134 |
| 4,543,719 | 10/1985 | Pardoe | 30/134 |
| 4,669,187 | 6/1987 | Pardoe | 30/134 |
| 4,670,983 | 6/1987 | Ramun et al. | 30/134 |
| 4,771,540 | 9/1988 | LaBounty | 30/134 |
| 4,776,093 | 10/1988 | Gross | 30/134 |
| 5,060,378 | 10/1991 | LaBounty et al. | 30/134 |

FOREIGN PATENT DOCUMENTS 2-232470  9/1990  Japan .................. E04G 23/08

Primary Examiner—Richard K. Seidel
Assistant Examiner—Hwei-Siu Payer
Attorney, Agent, or Firm—Pollock, Vande Sande & Priddy

[57] ABSTRACT

The present invention offers a steel-material shearing machine which nips steel materials after self adjusting to an optimum condition and shears all kinds of steel materials. The machine comprises: a supporting frame attached to a mounting bracket so that it can swivel freely; the mounting bracket mounted at the end of the arm of a work machine; a mechanism to hold the supporting frame to the mounting bracket by using a swivel brake mechanism until a swivel force of certain intensity is applied; a lower and upper jaws whose engaging parts are indented on their centers, and which are mounted on the supporting frame by first and second pivots respectively so that they can move freely; a synchronizing pin attached between the upper and lower jaws to operate them with equal angles; fan-shaped patching plates flush mounted on both sides of the upper and lower jaws where they make contact with the supporting frame; adjusting pins with adjustable depth attached on both sides of the supporting frame to press the patching plates; and lining plates attached on the inside of the tip of the lower jaw to guide the tip of the upper jaw.

4 Claims, 8 Drawing Sheets

STEEL-MATERIAL SHEARING MACHINE

This application is a continuation-in-part, continuation, of Ser. No. 07/916,615 filed on Jul. 22, 1992, now abandoned.

BACKGROUND OF THE INVENTION

1. Field of the Invention

This invention relates to a steel-material. shearing machine which is mounted at the end of the arm of work machines such as a power shovel to shear various steel materials.

2. Prior Art

There exist similar kinds of shearing machines, for instance, such as disclosed in the Japanese Patent Public Disclosure [KOKAI] No. 62-271619. As shown in FIG. 12, shearing machines of this kind are equipped with a lower jaw 2 at the end of an arm 1, and an upper jaw 3 is pivoted at the lower jaw 2 by a pivot shaft 4; said upper jaw 3 is operated by a hydraulic cylinder 5 located on the arm 1. The upper jaw 3 is moved against the lower jaw 2 to shear steel materials between the lower jaw 2 and upper jaw 3.

There are other crushing machines for shearing steel materials such as disclosed in the Japanese Patent Public Disclosure [KOKAI] NO 2-232470. A shearing machine of this kind is equipped with a supporting frame 7 to which the centers of a lower jaw 2 and upper jaw 3 are pivoted by shafts 8 as shown in FIG. 13. A hydraulic cylinder 9 is linked to each of the rear end of the lower jaw 2 and upper jaw 3 to nip and shear steel materials between them.

The steel-material shearing machines of the former category cannot change its direction easily since the lower jaw 2 is fixed at the end of the arm 1. In addition, because only the upper jaw 3 is moved, the opening angle is small, and its movement is slow. Furthermore, a large hydraulic cylinder is necessary in order to generate a large force.

The steel-materials shearing machines of the latter category require an inefficient working process because shearing position is fixed, and steel materials must be placed on the right position. In addition, the lower jaw 2 and upper jaw 3 do not cope with twisting. Therefore, shearing may not be completed well because of a gap between the lower jaw 2 and upper jaw 3 due to a large twisting force.

SUMMARY OF THE INVENTION

The present invention offers a steel-material shearing machine which provides an effective and easy operation in shearing steel materials.

The steel-material shearing machine of the present invention comprises;
- a mounting bracket attached at the end of an arm of a work machine;
- a supporting frame attached to said mounting bracket so that it can swivel freely;
- a lower jaw and an upper jaw, whose engaging parts are indented at their centers, and which are mounted on said supporting frame by a first and second pivots respectively so that they engage one another and move freely;
- lining plates for guiding the upper jaw, which is attached on the inside of the front end of said lower jaw to guide the non-shearing side of the front end of said upper jaw;
- fan-shaped patching plates pivoted with said first and second jaws on the both sides of said upper and lower jaws where they make contact with said supporting frame;
- adjusting pins with adjustable depth attached on the both sides of said supporting frame facing said patching plates;
- a synchronizing pin so that it can turn freely, which is attached between said tipper and lower jaws at the position nearest from said first and second pivots with the same distance therefrom;
- a hydraulic cylinder mounted between the rear ends of said tipper and lower jaws; and
- a swivel brake mechanism to hold said supporting frame to said mounting bracket until a swivel force of a certain intensity is applied to said supporting bracket.

The synchronizing pin may not be used.

Another steel-material shearing machine comprises:
- a mounting bracket attached at the end of an arm of a work machine;
- a supporting frame attached to said mounting bracket so that it can swivel freely;
- a lower jaw and an upper jaw, whose engaging parts are indented at their centers, and which are mounted on said supporting frame by a first and second pivots respectively so that they engage one another and move freely;
- lining plates for guiding the upper jaw, which is attached on the inside of the front end of said lower jaw to guide the non-shearing side of the front end of said upper jaw.
- fan-shaped patching plates pivoted with said first and second jaws on the both sides of said upper and lower jaws where they make contact with said supporting frame;
- adjusting pins with adjustable depth attached on the both sides of said supporting frame facing said patching plates;
- a synchronizing pin so that it can turn freely, which is attached between said upper and lower jaws at the position nearest from said first and second pivots with the same distance therefrom;
- a hydraulic cylinder mounted between the rear ends of said upper and lower jaws; and
- a swivel motor attached to said mounting bracket to swivel said supporting frame.

Alternatively, synchronizing pins may not be used.

Further embodiment of the steel-material shearing machine comprises;
- a mounting bracket attached at the end of an arm of a work machine;
- a supporting frame attached to said mounting bracket so that it can swivel freely;
- a lower jaw and an upper jaw, whose engaging parts are indented at their centers, and which are mounted on said supporting frame by a first and second pivot respectively so that they engage one another and move freely;
- lining plates for guiding the upper jaw, which is attached on the inside of the front end of said lower jaw to guide the non-shearing side of the front end of said upper jaw.
- fan-shaped patching plates pivoted with said first, and second jaws on the both sides of said upper and lower jaws where they make contact with said supporting frame;

adjusting pins with adjustable depth attached on the both sides of said supporting frame facing said patching plates;

a synchronizing pin so that it can turn freely, which attached between said upper and lower jaws at the position nearest from said first and second pivots with the same distance therefrom;

a hydraulic cylinder mounted between said supporting frame and the rear end of said upper jaw; and a swivel brake mechanism to hold said supporting frame to said mounting bracket until a swivel force of a certain intensity is applied to said supporting bracket.

Further embodiment of the steel-material shearing machine comprises;

a mounting bracket attached at the end of an arm of a work machine;

a supporting frame attached to said mounting bracket so that it can swivel freely;

a lower jaw and an upper jaw, whose engaging parts are indented at their centers, and which are mounted on said supporting frame by first and second pivots respectively so that they engage one another and move freely;

lining plates for guiding the upper jaw, which is attached on the inside of the front end of said lower jaw to guide the non-shearing side of the front end of said upper jaw.

fan-shaped patching plates pivoted with said first and second jaws on the both sides of said upper and lower jaws where they make contact with said supporting frame;

adjusting pins with adjustable depth attached on the both sides of said supporting frame facing said patching plates;

a synchronizing pin so that it can turn freely, which is attached between said upper and lower jaws at the position nearest from said first and second pivots with the same distance therefrom;

a hydraulic cylinder mounted between said supporting frame and the rear end of said upper jaw; and a swivel motor attached to said mounting bracket to swivel said supporting frame.

Further embodiment of the steel-material shearing machine comprises;

a mounting bracket attached at the end of an arm of a work machine;

a supporting frame attached to said mounting bracket so that it can swivel freely;

a lower jaw and an upper jaw, whose engaging parts are indented at their centers, and which are mounted on said supporting frame by a first and second pivots respectively so that they engage one another and move freely;

lining plates for guiding the upper jaw, which is attached on the inside of the front end of said lower jaw to guide the non-shearing side of the front end of said upper jaw.

fan-shaped patching plates pivoted with said first and second jaws on the both sides of said upper and lower jaws where they make contact with said supporting frame;

adjusting pins with adjustable depth attached on the both sides of said supporting frame facing said patching plates;

a first and second hydraulic cylinders mounted between said supporting frame and the rear end of said lower jaw and between said supporting frame and the rear end of said upper jaw: and a swivel brake mechanism to hold said supporting frame to said mounting bracket until a swivel force of a certain intensity is applied to said supporting bracket.

Another embodiment of the steel-materials shearing machine comprises;

a mounting bracket attached at the end of an arm of a work machine;

a supporting frame attached to said mounting bracket so that it can swivel freely;

a lower jaw and an upper jaw, whose engaging parts are indented at their centers, and which are mounted on said supporting frame by a first and second pivots respectively so that they engage one another and move freely;

lining plates for guiding the upper jaw, which is attached on the inside of the front end of said lower jaw to guide the non-shearing side of the front end of said upper jaw.

fan-shaped patching plates pivoted with said first and second jaws on the both sides of said upper and lower jaws where they make contact with said supporting frame;

adjusting pins with adjustable depth attached on the both sides of said supporting frame facing said patching plates;

a first and a second hydraulic cylinders mounted between the rear end of said lower jaw and said supporting frame, and between the rear end of said upper jaw and said supporting frame; and a swivel motor attached to said mounting bracket to swivel said supporting frame.

The steel-material shearing machines of the foregoing construction have upper and lower jaws whose engaging blades are indented at their centers. Because of this construction, steer materials which are nipped at any positions will be guided to the trough near the rear end of jaws, where the blades are indented most, and where the maximum shearing force can be obtained.

In addition, the upper and lower jaws are pressed from both sides by adjusting pins, eliminating play between the upper jaw and supporting frame. The upper jaw is guided by the lining plate attached on the lower jaw, also eliminating play. Even if a large twisting force generates between the upper and lower jaws, shearing without twisting is achieved.

In an embodiment in which a synchronizing pin is used between the upper lower jaws, the upper and lower jaws always move with equal angles. This enables the upper and lower jaws to be opened quickly and to a large angle. Furthermore, because the upper and lower jaws move together due to the synchronizing pin, they can be operated by the hydraulic cylinder mounted between the rear ends of the upper and lower jaws. Alternatively, the upper and lower jaws may be operated by using either one of two only and making the other follow it.

A supporting frame with upper and lower jaws is attached to a mounting bracket so that it can swivel freely, and a swivel brake mechanism is employed to hold the supporting frame until a swivel force greater than a certain intensity is applied to it. In such an embodiment, the upper and lower jaws can be made closer to steel materials at a predetermined angle, and the upper and lower jaws are self-adjusted to an optimum condition for shearing due to the swiveling of the supporting frame exerted by nipping force.

In an embodiment in which a swivel motor is attached to the mounting bracket to swivel the supporting frame, the angle of the upper and lower jaws can be changed to desired one. It provides shearing of steel materials at any angle.

Therefore, these steel-material shearing machines have the capability of shearing steel materials in the rear end of the upper and lower jaws at an optimum angle without play.

PREFERRED EMBODIMENTS

Figure 1:
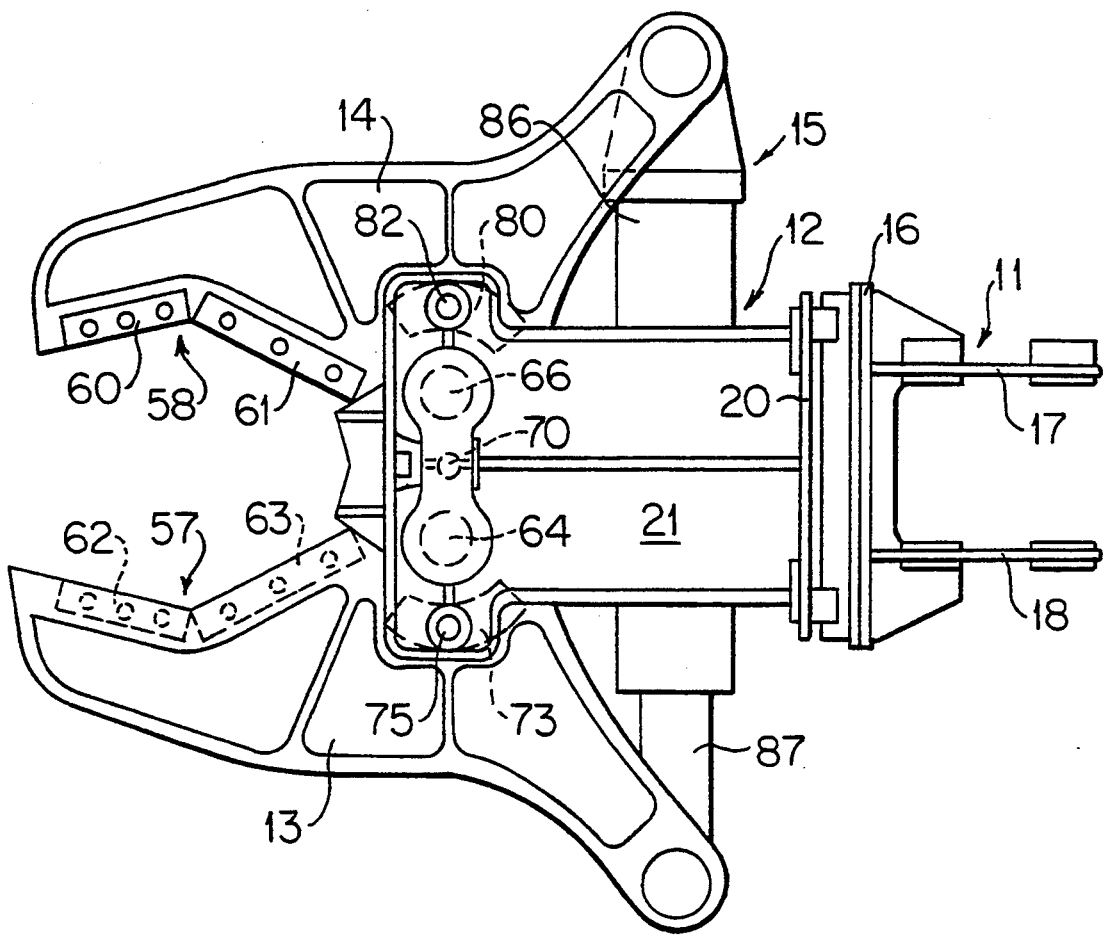
FIG. 1 is a side view of a steel-material shearing machine of the present invention.
Figure 2:
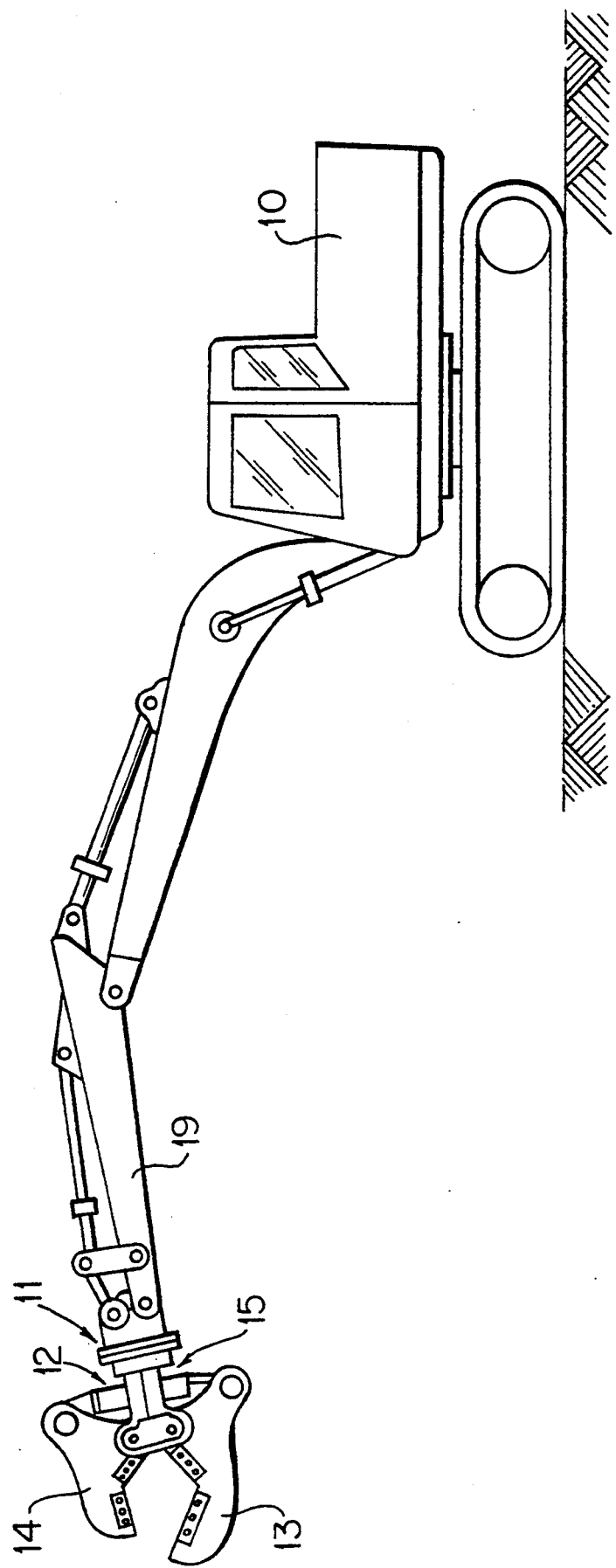
FIG. 2 is a side view of a power shovel with a steel-material shearing machine of the present invention.

Preferred embodiments of this invention will be described below with reference to the accompanying drawings. As shown in FIGS. 1 and 2, the steel-material shearing machine is equipped with, a mounting bracket 11 attached at the end of an arm 19 of various types of work machines 10 such as power shovel, a supporting frame 12 movably attached for swiveling at the end of the mounting bracket 11, a lower jaw 13 and an upper jaw 14 movably attached to the supporting bracket 12 so that they engage with one another, and a hydraulic cylinder 15 to operate the lower jaw 13 and upper jaws 14.

Figure 4:
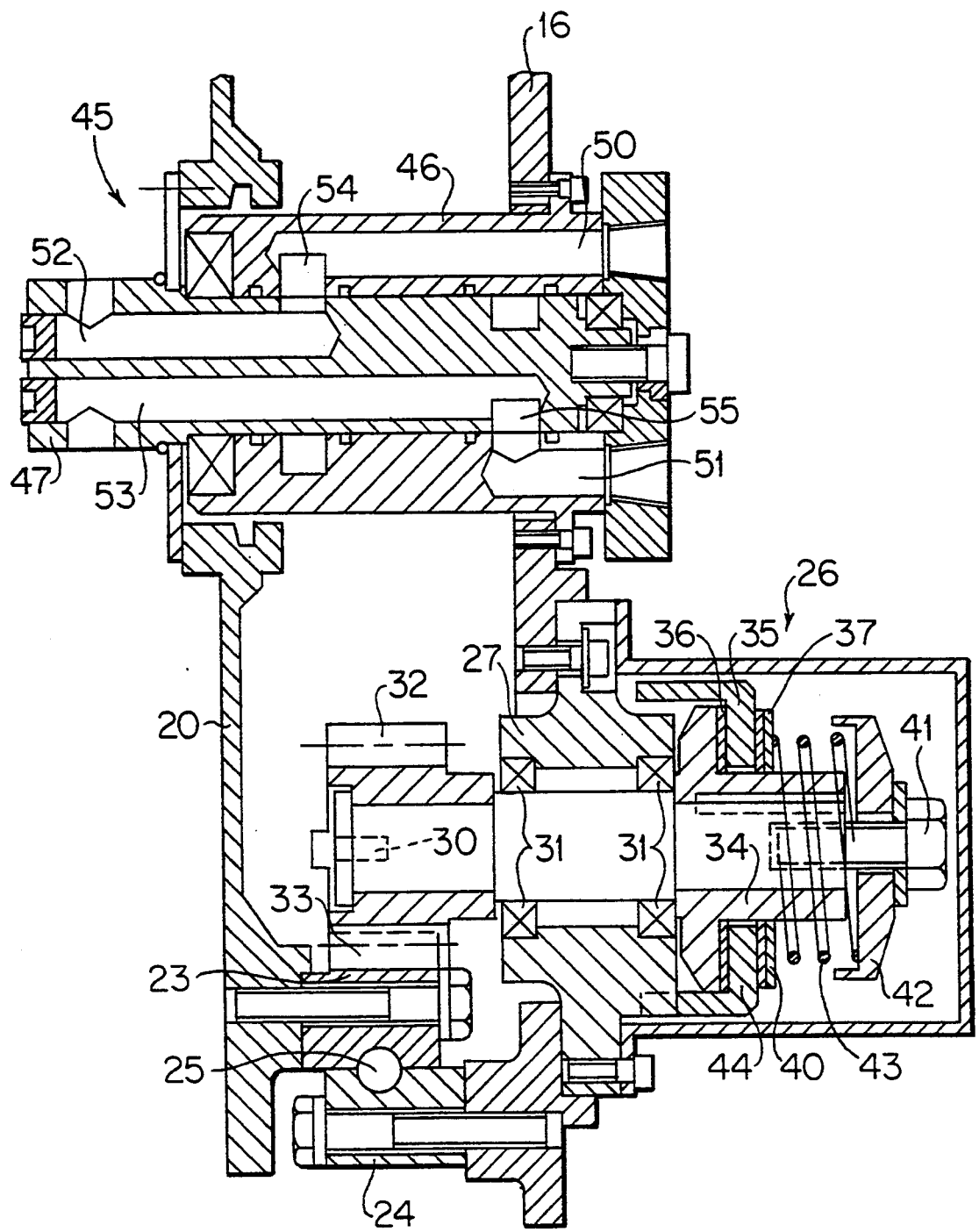
FIG. 4 is an enlarged section of the swivel brake mechanism of the present invention.
Figure 5:
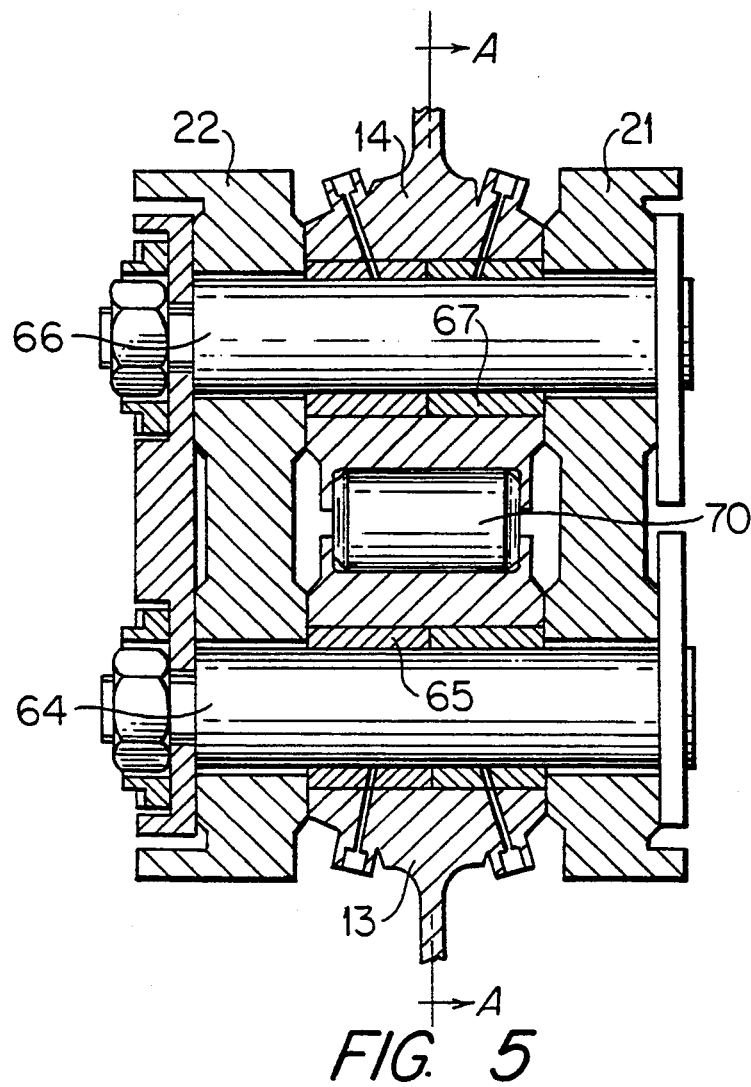
FIG. 5 is an enlarged section of the supporting part of the upper and lower jaws of the present invention.

The mounting bracket 11 has a mounting flange 16 which is equipped with two fixing arms 17 and 18, both protruding from the back. These two arms 17 and 18 are to be attached at the end of the arm 19 of a work machine. The supporting frame 12 has a base plate 20 which is equipped with two supporting arms 21 and 22. Refer to FIG. 5. This supporting frame 12 has a ring gear 23 on the back end of the base plate 20 as shown in FIG. 4. The ring gear 23 is to be inserted into the fixing ring 24 which is attached at the front end of the mounting flange 16 on the mounting bracket 11. Many balls 25 are used between them to form a bearing by the ring gear 23, the fixing ring 24 and the balls 25 so that it can be movably attached for free swiveling to the mounting bracket 11.

A swiveling brake mechanism 26 is provided between the mounting bracket 11 and the supporting frame 12 so that the supporting frame 12 is fixed to the mounting bracket 11 until a swiveling force of certain intensity is applied to it. The swiveling brake mechanism 26 has a housing 27 attached on the mounting flange 16 of the mounting bracket 11, and a swivel shaft 30 is located and movably supported by the bearings 31 within the housing 27. A pinion 32 Is spline-fitted to the swivel shaft 30 at its end. The pinion 32 is engaged with the gear 33 formed on the inner surface of the ring gear 23. A hub 34 is key-fitted at the rear end of the swivel shaft 30. On the outer periphery of the hub 34, a disk 35 is movably attached with two friction plates 36 and 37 on both sides. At its rear end, a pushing plate 40 is movably attached. A coil spring 43 is compressed and located between the pushing plate and the spring receiver 42 which is fixed at the rear end of the swivel shaft 30 by bolt 41. Part of the disk 35 is engaged with the housing 27 so that it will not turn.

The aforementioned swivel brake mechanism 26 prevents the holding frame 12 from swiveling via the pinion 32 and the ring gear 23 by means of braking the hub 34 and swivel shaft 30 by friction; the friction generated by the coil spring 43 presses the pushing plate 40, friction plates 36 and 37, and disk 35 onto the flange 44 of the hub 34. When a turning force larger than the aforementioned friction force is applied on the holding frame 12, slippage between the disk 35 and friction plates 36 and 37 take place, thus causing the hub 34 to turn and the holding frame 12 to swivel.

At the swiveling center of the holding frame 2, a swivel joint 45 for hydraulic pipe connection is provided between itself and the mounting bracket 11. The swivel Joint 45 Is composed of an outer cylinder 46 and a swivel shaft 47 as shown in FIG. 4. The swivel shaft 47 is located within the outer cylinder 46 so that it can swivel freely. The first path 50 and second path 51 are provided within the outer cylinder 46, and the third path 52 and fourth path 53 are provided on the swivel shaft 47. The above-mentioned first path 50 and the third path 52 are connected with each other via the first ring groove 54 which is provided on the outer cylinder 46. On the other hand, the above-mentioned second path 51 and the fourth path 53 are connected with one another via the second ring groove 55 which is provided on the swivel shaft 47.

Connected to the first path 50 and the second path 51 of the outer cylinder 46 are hydraulic pipes not shown in the figure from the work machine, while the third path 52 and the fourth path 53 are connected via pipe to the hydraulic cylinder 15 for shearing. Therefore, hydraulic oil is readily supplied to the hydraulic cylinder 15 even while the supporting frame 12 is swiveling.

Figure 3:
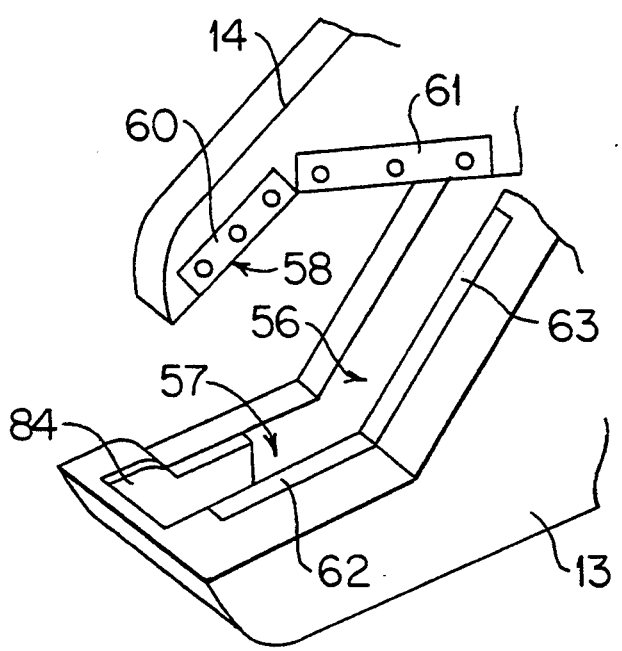
FIG. 3 is a solid illustration of the front park of the upper and lower jaws of the present invention.

The lower jaw 13 and tipper jaw 14 attached on the holding frame 12 are nearly symmetric when viewing from the side. A space 56 is provided at the front part of the lower jaw 13 as shown in FIG. 3 so that the front part of the upper jaw 14 goes in. The surfaces 57 and 58 where shearing takes place by the engagement of the lower jaw 13 and upper jaw 14 are hollowed outwards at its center. Shearing blades 60 and 61 arc attached to the shearing surface of the upper jaw 14. Likewise, shearing blades 62 and 63 are attached on the inner surfaces of the lower jaw 13 where the above-mentioned shearing blades 60 arid 61 are engaged with.

Figure 6:
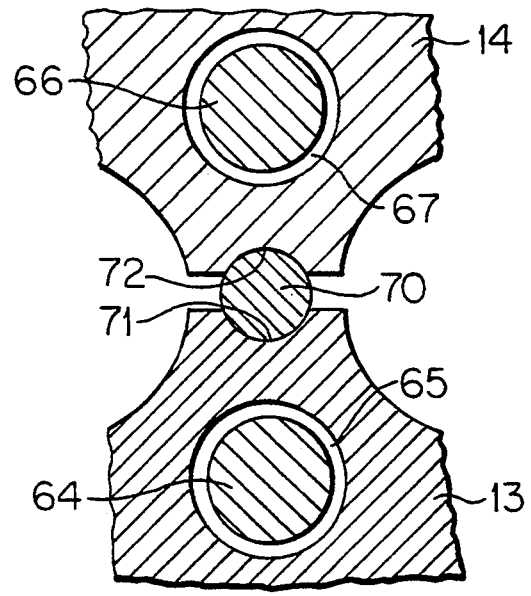
FIG. 6 is a section on line A—A of FIG. 5.

The aforementioned lower jaw 13 has an intermediary part within the supporting arms 21 and 22 of the holding frame 12 as shown in FIGS. 5 and 6, and is movably supported via a bushing 65 to the first pivot 64 located between the supporting arms 21 and 22. On the other hand, the upper jaw 10 has an intermediary part within the supporting arms 21 and 22 so that it faces the lower jaw 13, and is movably supported via a bush 67 to the second pivot 66 located between the supporting arms 21 and 22.

A synchronizing pin 70 is provided between the lower jaw 13 and upper jaw 14 at the position nearest from the first pivot 64 and the second pivot 66 with the same distance therefrom. The synchronizing pin 70 is supported by holding grooves 71 and 72 provided on the lower jaw 13 and on the upper jaw 14, respectively; the shape of which are almost semi-circle. Accordingly, the lower jaw 13 and upper jaw 14 are connected with one another via the synchronizing pin 70. When they open or close, the synchronizing pin 70 moves back and forth to synchronize the lower jaw 13 and the upper jaw 14, and to move them with the same angles.

Figure 8:
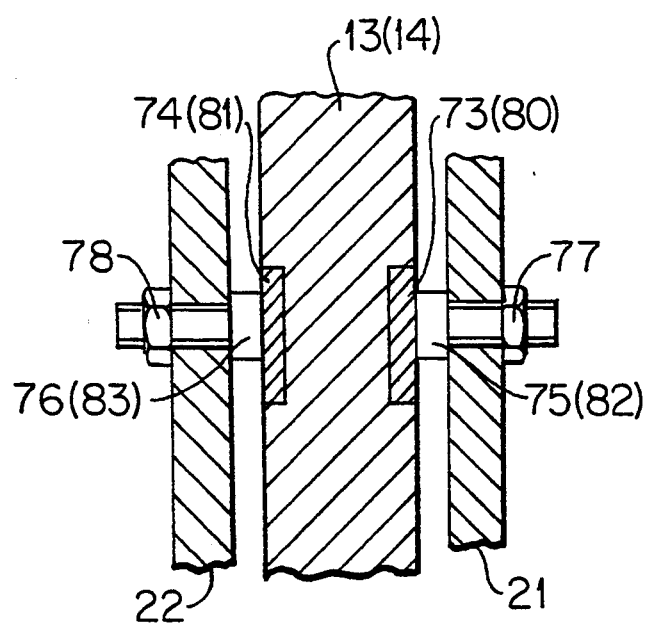
FIG. 8 is a section of the mounting part of an adjusting pin.

As shown in FIG. 8 patching plates 73 and 74 are flush mounted on both sides of the lower jaw 13 facing the supporting arms 21 and 22; the patching plates are fan-shaped with its center at the first pivot 64. As shown in FIG. 8, adjusting pins 75 and 76 pass through the supporting arms 21 and 22, and are screw-fitted. Then its location is fixed by nuts 77 and 78, and the patching plates 73 and 74 are pressed from the both sides to eliminate play of the lower jaw 13. Similarly, patching plates 80 and 81 are flush mounted on both sides of the upper jaw 14 facing the supporting arms 21 and 22; the patching plates are fan-shaped with its center at the second pivot 66. In addition, adjusting pins 82 and 83 are attached to the supporting arms 21 and 22 in such a way that they can be positioned freely; the adjusting pins 82, 83 are to press the patching plates 80 and 81.

As shown in FIG. 8 the jaw portions 13 and 14 between transversely aligned patching plates 73 and 74 or 80 and 81 are solid.

Figure 7:
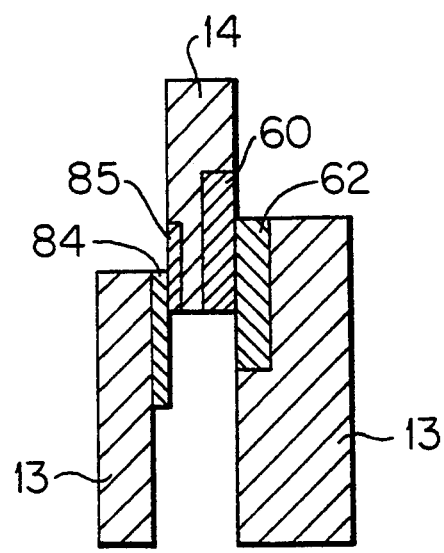
FIG. 7 is a section of the front end of the lower jaw of the present invention.

As shown in FIG. 7, a lining plate 84 is provided on the inner surface of the front end part of the lower jaw 13, where it is engaged with the non-shearing side of the front end part of the upper jaw 14, to eliminate play by guiding the upper jaw 14. A patching plate 85 is also attached on the upper jaw 14 to contact lining plate 84.

The hydraulic cylinder 15 for shearing is located between the supporting arms 21 and 22 of the supporting frame 12. The cylinder 86 is movably connected to the rear end of the tipper jaw 14, while the piston rod 87 is movably connected to the rear end of the lower jaw 13. Accordingly, operating the hydraulic cylinder 15 will cause the lower jaw 13 and upper jaw 14 to nip and shear steel materials.

In the steel-material shearing machine described above, the lower and upper jaws 13 and 14 are first opened, and steel materials are placed in position by operating the working machine arm. Then, the hydraulic cylinder 15 is actuated to close the lower and upper jaws 13 and 14 to shear steel materials. When the steel-material shearing machine nips steel materials in twisted conditions, a large twisting force will generate on the lower and upper jaws 13 and 14 due to the reaction force of the steel materials during the shearing process. The twisting force overwhelms the braking force from the swiveling braking mechanism 26, causing the supporting frame 12, lower jaw 13 and upper jaw 14 to swivel and to adjust automatically the steel-material shearing machine to an optimum angle. Furthermore, thanks to the inclination of the lower and upper jaws 13 and 14 at the engaging part, steel materials are guided to the trough near the rear end of the jaws, providing smooth shearing without giving a large load to the steel-material shearing machine. In addition, the lower jaw 13 and upper jaw 14 are pressed from both sides by the adjusting pins 75, 76, 82 and 83 in the supporting frame 12, providing no play. The upper jaw 14 is guided by the lining plate 84 attached on the lower jaw 13, also providing no play. The jaws without play section reliable shearing.

In the foregoing preferred embodiment, a synchronizing pin 70 is used between the lower jaw 14 and upper jaw 13 to operate the jaws with equal angles. This synchronizing pin 70 may not necessarily be used. In such a case, the lower jaw 13 and the upper jaw 14 do not operate with equal angles. However, steel materials are nipped by the jaws, and are eventually sheared.

Figure 9:
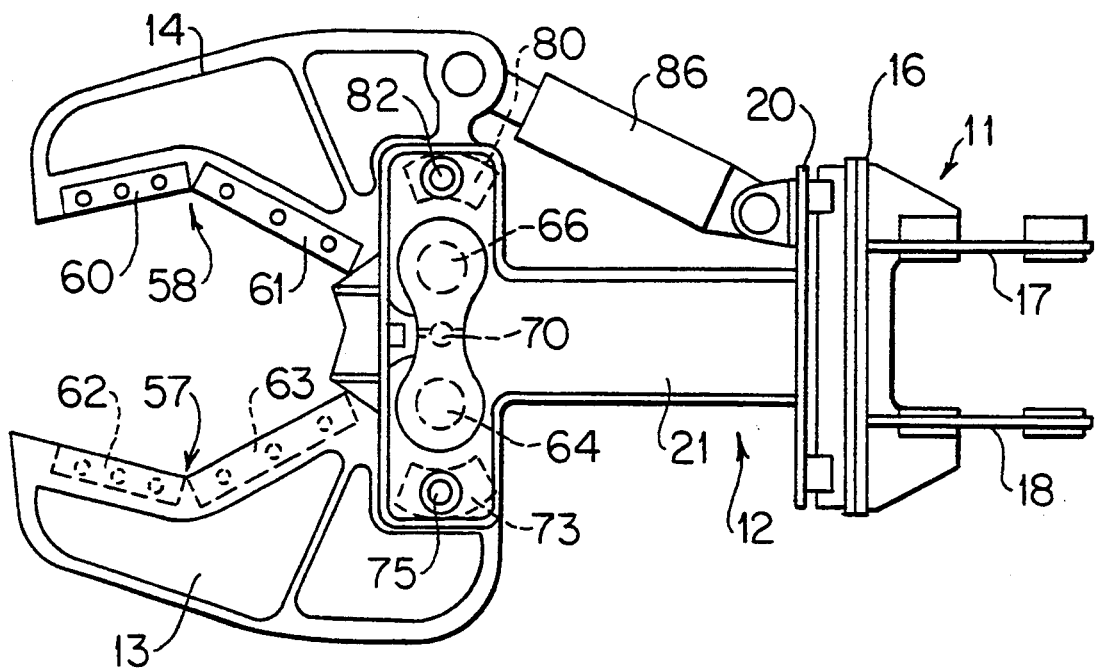
FIG. 9 is a side view illustrating another embodiment of a steel-material shearing machine of the present invention.

In the foregoing preferred embodiment, one hydraulic cylinder 86 is attached to both the lower jaw 13 and upper jaw 14 to operate the jaws. However, as shown in FIG. 9, a hydraulic cylinder 86 may be attached between the base plate 20 of the supporting frame 12 and the upper jaw 14 to move only the upper jaw 14 whose movement is then transmitted to the lower jaw 13 via the synchronized pin 70 to move both jaws to shear steel materials.

The foregoing construction in which only the upper jaw 14 is operated provides shearing of steel materials without problems because the lower jaw 13 and upper jaw 14 are linked by the synchronizing pin 70 so that they move in synchronized movement.

Figure 10:
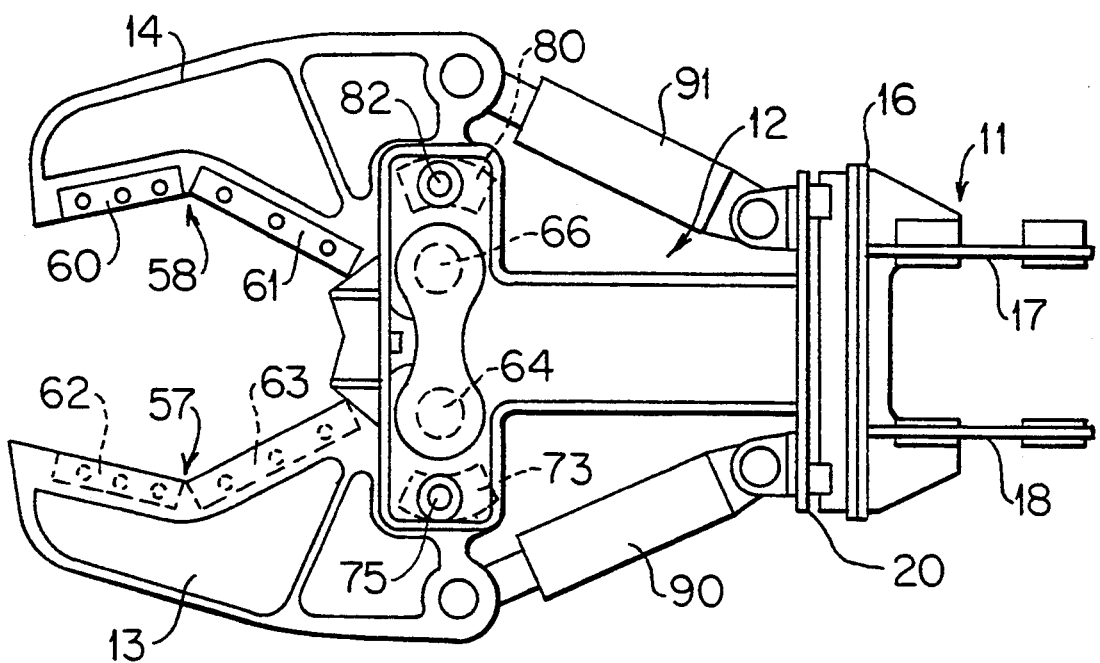
FIG. 10 is a side view illustrating another embodiment of a steel-material shearing machine of the present invention.

Alternatively, as shown in FIG. 10, a first and second hydraulic cylinders 90 and 91 may be attached between the base plate 20 of the supporting frame 12 and the lower jaw 13, and between the base plate 20 and the upper jaw 14, respectively, In order to operate the first and the second cylinders simultaneously to shear steel materials. In this case, however, the synchronizing pin 70 between the lower jaw 13 and upper jaw 14 should be taken off. In addition, hydraulic pipings should be arranged in series to the first and second hydraulic cylinders 90 and 91 so that the both hydraulic cylinders can be operated simultaneously by one hydraulic unit.

In this embodiment using a single hydraulic system, even if one of the hydraulic cylinders stops during the shearing process of steel materials, the other hydraulic cylinder will continue to operate to complete shearing. For instance, when the upper jaw 14 makes contact with steel materials first, the second hydraulic cylinder 91 stops. Then the hydraulic oil is sent to the first hydraulic cylinder 90, moving only the lower jaw 13. The steel material is nipped between the both jaws and shearing is completed. Conversely, when the lower jaw 13 stops first after contact with steel materials, the upper jaw 14 will continue to move to complete shearing.

Figure 11:
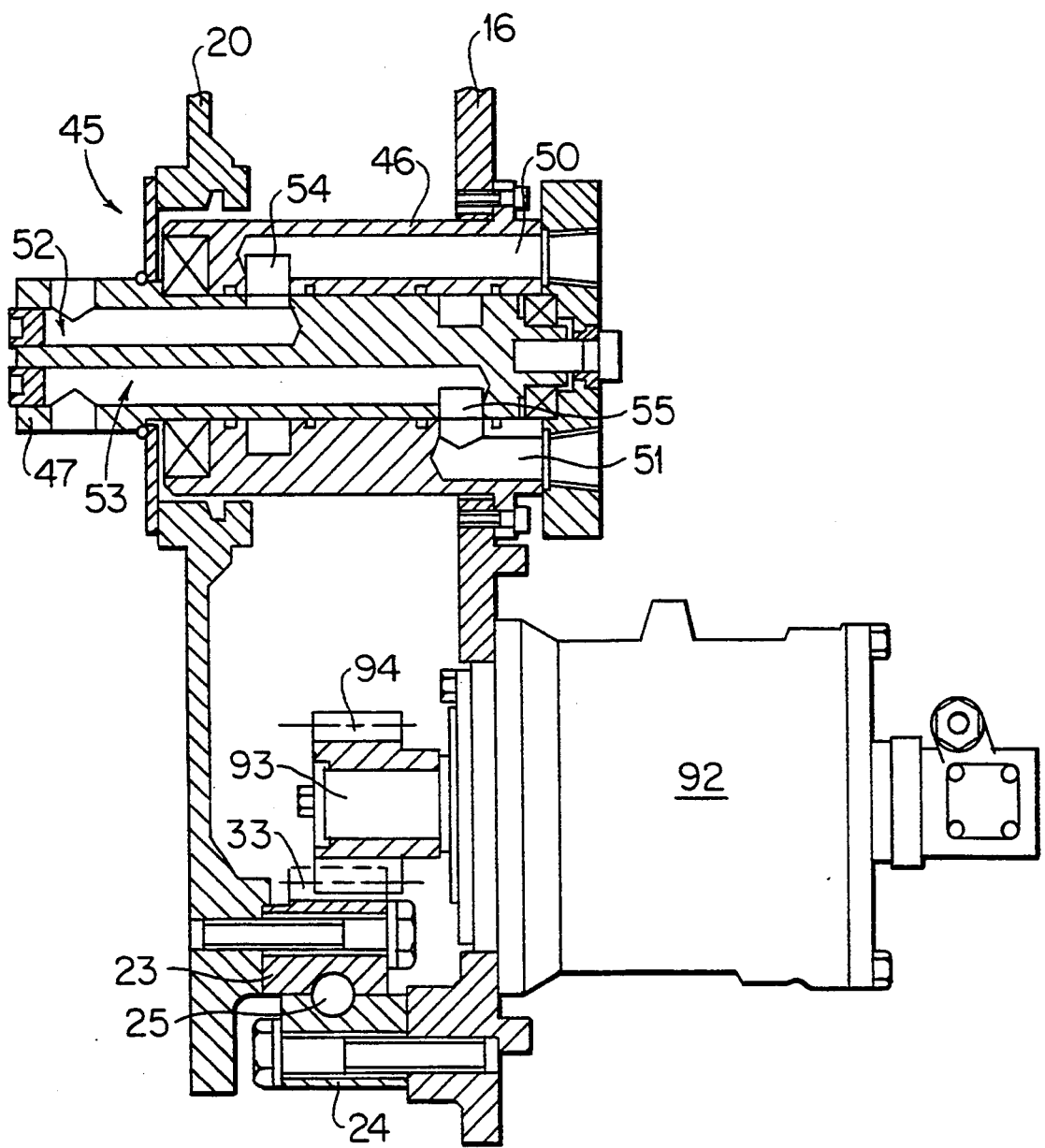
FIG. 11 is a section of a swiveling part of the supporting frame of another embodiment of the present invention.
Figure 12:
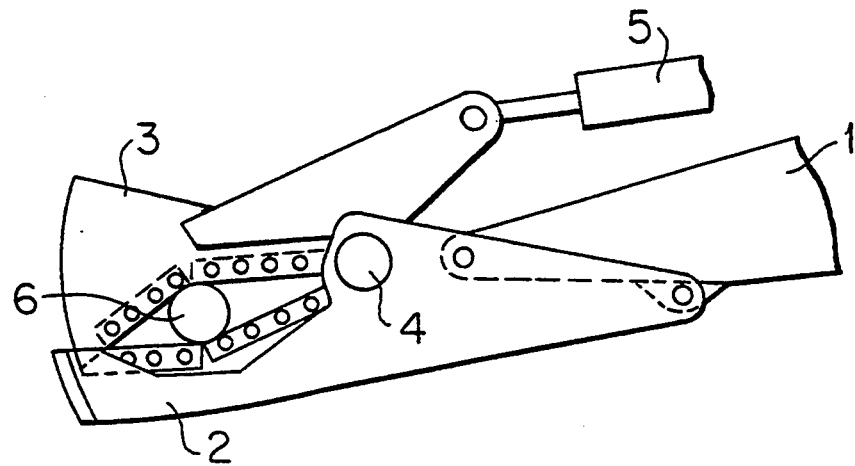
FIG. 12 is a section of a conventional shearing machine.
Figure 13:
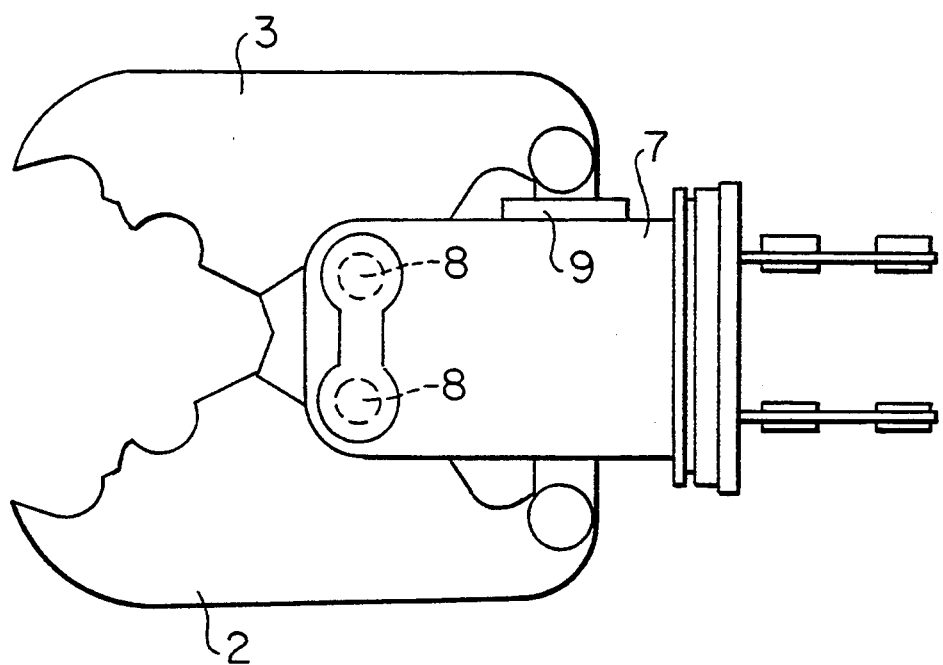
FIG. 13 is a section of a conventional crushing machine.

Furthermore, in the foregoing preferred embodiment, a swivel brake mechanism 26 is provided on the bracket 11 and the supporting frame 12 is fixed to the mounting bracket 11 so that the supporting frame 12 is swiveled when loads greater than certain intensity is applied. Alternatively, as shown in FIG. 11, a swivel motor such as a hydraulic motor 92 may be mounted on the mounting flange 16 of the mounting bracket 11. A driving gear 94 attached on the drive shaft 93 of the hydraulic motor 92 may be engaged with the gear 33 of the ring gear 23 to swivel the supporting frame 12 by the hydraulic motor 92.

In a construction in which a hydraulic motor 92 swivels the supporting frame 12, the angles of the upper and lower jaws 13 and 14 are adjusted by swiveling the supporting frame 12 through the hydraulic motor 92 before nipping and shearing of steel materials.

According to the present invention, the engaging parts of the upper and lower jaws are indented on the center, causing the steel materials to move automatically toward the rear end of the jaws, the location of which is suitable for shearing when nipping steel materials between the jaws. Play between the upper jaw and the supporting frame is eliminated by pressing both jaws using adjusting pins. Play is also eliminated by guiding the tip of the upper jaw by a lining plate mounted on the lower jaw. The elimination of play enables reliable shearing of steel materials. Excellent durability is also achieved since overloads are not applied on the upper and lower jaws.

When nipping steel materials, the upper and lower jaws swivel automatically to adjust by themselves to obtain an optimum angle for shearing by movably mounting the supporting frame to the bracket, and by holding the supporting frame until a swivel force greater than certain intensity is applied by the swivel brake mechanism, even when the upper and lower jaws shear steel materials with some angles.

In the embodiment in which a swivel motor is mounted between the supporting frame and mounting bracket, the upper and lower jaws can be swiveled to desired angles, providing an easy shearing operation of steel materials of every angle.

In the embodiment in which a synchronizing pin is used between the upper and lower jaws to operate the jaws with equal angles, a single hydraulic cylinder operates the upper and lower jaws accurately, proving a compact overall construction.

In the embodiment in which the upper and lower jaws are independently operated, shearing can be done by a very large force, providing an easy, reliable shearing operation of large steel materials.

We claim:
1. A shearing machine comprising:
  a mounting bracket mounted to the end of a work vehicle arm;
  a supporting frame;
  means connected between the mounting bracket and the frame for allowing the frame to swivel relative to the bracket;
  upper and lower angled jaws connected to the frame by respective pivots;
  a lining plate attached to an inner side surface of a front recess of said lower angled jaw for slidingly contacting a front side portion of the upper jaw thereby guiding the upper jaw into the recess;
  a plurality of arcuate patching plates flush mounted within outer surfaces of the upper and lower jaws, confronting the supporting frame;
  a plurality of adjusting pins mounted to the supporting frame contacting corresponding patching plates for adjusting lateral play between the upper and lower jaws:
  each jaw portion between transversely aligned patching plates being solid;
  hydraulic means connected to at least one of the jaws for moving the jaws into and out of engagement; and
  means connected between the mounting bracket and the frame for biasing the supporting frame relative to the mounting bracket for preventing swivel rotation therebetween until a twist force, exceeding a predetermined value, is exerted on the supporting frame.

2. The machine set forth in claim 1 further comprising a synchronizing pin located equally distant from the pivots and connecting the upper and lower jaws for synchronizing movement of the jaws.

3. A shearing machine comprising:
  a mounting bracket mounted to the end of a work vehicle arm:
  a supporting frame;
  means connected between the mounting bracket and the frame for allowing the frame to swivel relative to the bracket;
  upper and lower angled jaws connected to the frame by respective pivots;
  a lining plate attached to an inner side surface of a front end recess of said lower angled jaw for slidingly contacting a front side portion of the upper jaw thereby guiding the upper jaw into the recess;
  a plurality of arcuate patching plates flush mounted within outer surfaces of the upper and lower jaws confronting the supporting frame;
  a plurality of adjusting pins mounted to the supporting frame contacting corresponding patching plates for adjusting lateral play between the upper and lower jaws;
  each jaw portion between transversely aligned patching plates being solid;
  hydraulic means connected to at least one of the jaws for moving the jaws into and out of engagement; and
  means for controlling swivel rotation of the support frame relative to the bracket for presetting the angle of the jaws relative to a workpiece to be sheared.

4. The machine set forth in claim 3 further comprising a synchronizing pin located equally distant from the pivots and connecting the upper and lower jaws for synchronizing movement of the jaws.

* * * * *